(12) United States Patent
Jakobsen et al.

(10) Patent No.: US 8,229,523 B2
(45) Date of Patent: Jul. 24, 2012

(54) LOCKING MECHANISM

(75) Inventors: Niels Jakobsen, Copenhagen (DK); Bo Petersen, Dyssegaard (DK)

(73) Assignee: Nokia Corporation, Espoo (FI)

( * ) Notice: Subject to any disclaimer, the term of this patent is extended or adjusted under 35 U.S.C. 154(b) by 1093 days.

(21) Appl. No.: 12/127,315

(22) Filed: May 27, 2008

(65) Prior Publication Data

US 2009/0293561 A1 Dec. 3, 2009

(51) Int. Cl.
*G06F 15/18* (2006.01)

(52) U.S. Cl. .................................. 455/575.3; 455/575.4

(58) Field of Classification Search ............... 455/550.1, 455/575.1, 575.3, 575.4, 575.6, 575.8, 90.1–90.3
See application file for complete search history.

(56) References Cited

U.S. PATENT DOCUMENTS

| | | | | |
|---|---|---|---|---|
| 5,094,009 | A | * | 3/1992 | Koch et al. ..................... 33/834 |
| 2002/0186110 | A1 | * | 12/2002 | Tibbetts et al. ............... 335/220 |
| 2008/0132302 | A1 | * | 6/2008 | Schechtel et al. .......... 455/575.4 |

\* cited by examiner

*Primary Examiner* — Sam Bhattacharya
(74) *Attorney, Agent, or Firm* — Harrington & Smith (57) ABSTRACT

A locking mechanism having a magnet and a spring. The magnet is configured to cooperate with an anchor and the spring is configured to suspend the magnet whereby said magnet is capable of being movably connected to a housing body.

20 Claims, 5 Drawing Sheets

LOCKING MECHANISM

FIELD

The present application relates to a device having an improved locking mechanism, and in particular to an improved locking mechanism capable of withstanding drop shocks.

BACKGROUND

More and more electronic devices such as mobile phones, MP3 players, Personal Digital Assistants (PDAs) are becoming smaller and smaller while having more and more information stored and/or accessible through them. Users are relying on these devices and becoming all the more dependant on them. Due to this they are designed to be small and easy to carry around. However, as the user carries his device with him he will sometimes be in situations or environments where he will drop his device and for this reason a device must be able to withstand a certain amount of shocks and still be able to work according to specifications. In some devices having two or more body parts that are hingably or foldably connected it is important that the two parts are able to maintain the positions they are put in by a user even as the device is dropped. For example a clam shell phone that does not remain closed when dropped will be very annoying to a user. Such clam shell phones and also other devices having foldably or hingeably connected parts are known to use a magnet, possibly an electrical magnet cooperating with an anchor plate or other magnet to maintain the two body parts in a closed position. However as these devices are dropped the surfaces of the magnet and the anchor plate are forced apart or out of alignment by the shock to the device as it is dropped and this leads to a reduced magnetic flux between the anchor plate and the magnet which can lead to a failure in keeping the device properly closed. Also, the magnet may also shift or rotate by a small amount as it is dropped and this can also lead to a change in the magnetic flux also resulting in a failure to keeping the two body parts together i.e. in a locked position.

A device that employs a robust locking mechanism for keeping two body parts temporarily secured in a closed position would thus be useful in modern day society.

SUMMARY

On this background, it would be advantageous to provide a device and a method that overcomes or at least reduces the drawbacks indicated above by providing a locking mechanism with a movable magnet or in other words a suspending mechanism for a locking system.

This provides for a more robust operation as the magnet can move according to received shocks and thereby maintain a steady magnetic flux keeping two housing bodies in a closed position.

The disclosed embodiments provide a locking mechanism comprising a magnet and a spring, said magnet being configured to cooperate with an anchor plate and said spring being configured to suspend said magnet whereby said magnet being capable of being movably connected to a housing body.

This allows the magnet to remain co-planar with the anchor plate or in other words to maintain a magnetic flux cooperating with the anchor plate strong enough so that a housing body comprising the anchor plate will remain locked to a housing body comprising the magnet even when subjected to mechanical shock.

In one embodiment the locking mechanism further comprises a mechanical stop.

This protects the spring from being deformed should a too strong shock be received.

In one embodiment the locking mechanism further comprises an interface surface for cooperating with a supporting surface. This makes it easier to mount the locking mechanism. Preferably these interface surfaces are arranged with deflection areas to further increase the spring effect.

In one embodiment the spring comprises the interface surface.

In one embodiment the spring and the interface surface consist of one unitary body. This makes it easier to produce and assemble the locking mechanism.

In one embodiment the spring comprises a deflection area in said unitary body.

In one embodiment the spring is a magnetic spring.

In one embodiment the spring is a mechanical spring.

In one embodiment the magnet comprises an electromagnet and a permanent magnet. And in one embodiment the electromagnet is configured to neutralize said permanent magnet when activated.

This allows the locking mechanism to remain active even when a device incorporating said locking device is without power or is turned off.

The aspects of the disclosed embodiments are also directed to providing a device incorporating and implementing or configured to incorporate and implement a locking mechanism according to above.

In one embodiment the device is a mobile communication terminal, a media player, a photographic camera, a video camera, a game console, a calculator, a Personal computer, Palmtop- or Laptop computers, GPS devices or personal digital assistants, PDAs or the like.

Such a device has the same advantages of the locking module above.

The aspects of the disclosed embodiments are also directed to providing a printed wire board comprising a cavity configured to at least partially receive a locking mechanism according to above.

In one embodiment the locking mechanism comprises a mechanical stop arranged on an opposite side of said printed wire board with regards to a side of said magnet being capable of being active, said mechanical stop extending beyond said cavity.

In one embodiment the locking mechanism comprises an interface surface arranged to attach said spring to said printed wire board.

In one embodiment the cavity is a hole through said printed wire board.

The aspects of the disclosed embodiments are also directed to providing a device incorporating or configured to incorporate a printed wire board according to above.

In one embodiment the device is a mobile communication terminal, a media player, a photographic camera, a video camera, a game console, a calculator, a Personal computer, Palmtop- or Laptop computers, GPS devices or Personal digital assistants, PDAs or the like.

Such a device has the same advantages of the locking module above.

The aspects of the disclosed embodiments are also directed to providing a device comprising a first and a second housing body configured to assume an open and a closed position wherein a locking mechanism according to above is arranged in said first housing and an anchor plate is arranged in said second housing body.

In one embodiment the first and second housing bodies are movably connected by a hinge.

In one embodiment the device is a mobile communication terminal, a media player, a photographic camera, a video camera, a game console, a calculator, a Personal computer, Palmtop- or Laptop computers, GPS devices or PDAs or the like.

The aspects of the disclosed embodiments are also directed to providing a method for maintaining two housing bodies of a device in a closed position comprising exerting a magnetic force from a magnet arranged in one of said housing bodies on an anchor plate arranged in another of said housing bodies, receiving mechanical shocks to said device and moving said magnet according to said received shocks to maintain said magnetic force strong enough to maintain said two housing bodies in said closed position.

This method and the embodiments below have the same advantages as are outlined above.

In one embodiment the method further comprises suspending said magnet by a spring.

The aspects of the disclosed embodiments are also directed to providing a device incorporating and implementing or configured to incorporate and implement a method according to above.

The aspects of the disclosed embodiments are also directed to providing a device comprising two housing bodies configured to assume an open and a closed position, said device further comprising magnetic means for maintaining said housing bodies in said closed position, said magnetic means comprising suspension means for moving said magnetic means in accordance with mechanical shocks received by said device.

In one embodiment the suspension means comprises spring means.

In one embodiment the device is a mobile communication terminal, a media player, a photographic camera, a video camera, a game console, a calculator, a Personal computer, Palmtop- or Laptop computers, GPS devices or PDAs or the like.

Further objects, features, advantages and properties of device, method and computer readable medium according to the present application will become apparent from the detailed description.

BRIEF DESCRIPTION OF THE DRAWINGS

In the following detailed portion of the present description, the teachings of the present application will be explained in more detail with reference to the example embodiments shown in the drawings, in which.

DETAILED DESCRIPTION

In the following detailed description, the device, the method and the software product according to the teachings for this application in the form of a cellular/mobile phone will be described by the embodiments. It should be noted that although only a mobile phone is described the teachings of this application can also be used in any electronic device such as laptops, PDAs, mobile communication terminals, electronic books and notepads and other electronic devices offering access to information.

Figure 1:
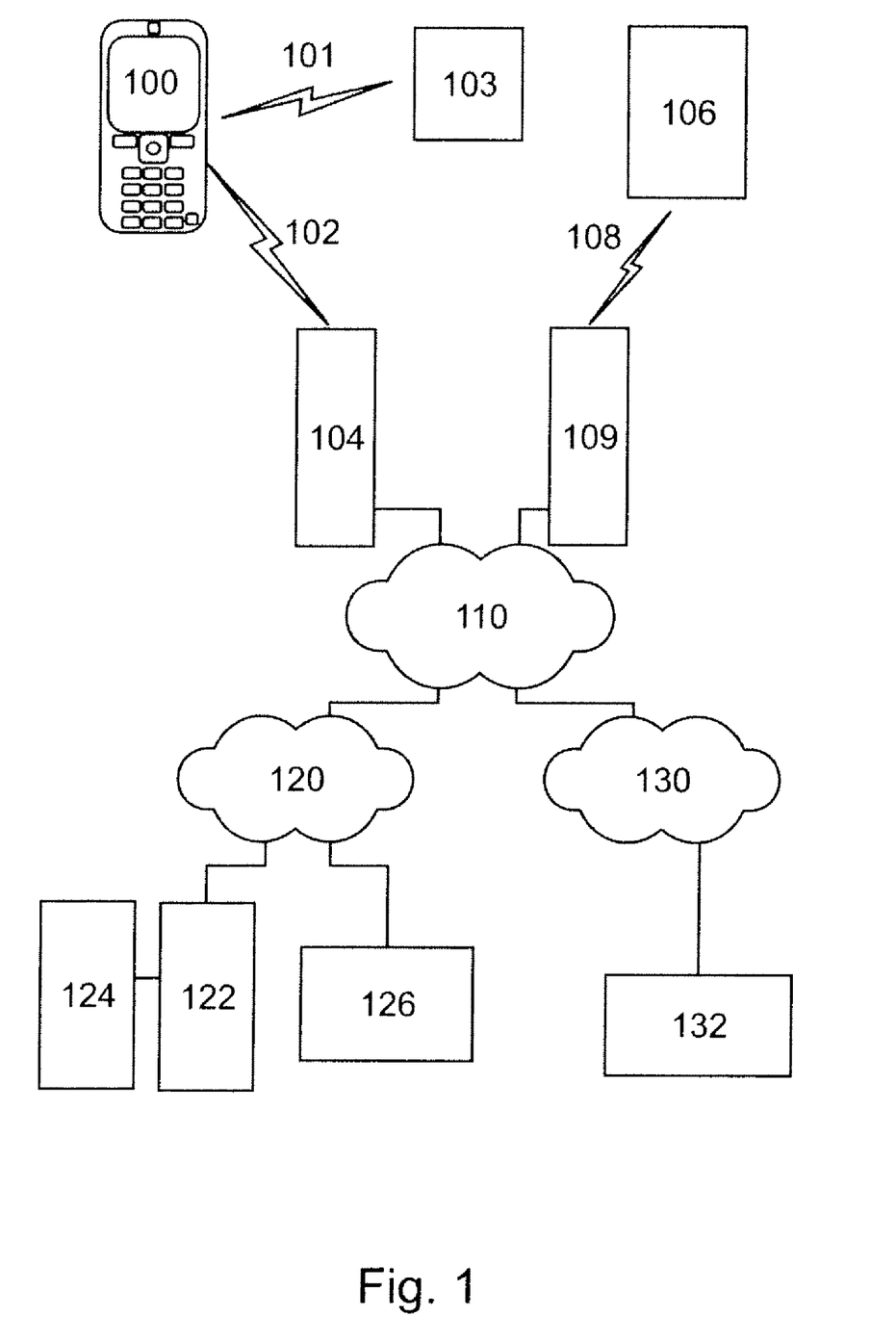
FIG. 1 is an overview of a telecommunications system in which a device according to the present application is used according to an embodiment.

FIG. 1 illustrates an example of a cellular telecommunications system in which the teachings of the present application may be applied. In the telecommunication system of FIG. 1, various telecommunications services such as cellular voice calls, www/wap browsing, cellular video calls, data calls, facsimile transmissions, music transmissions, still image transmissions, video transmissions, electronic message transmissions and electronic commerce may be performed between a mobile terminal 100 according to the teachings of the present application and other devices, such as another mobile terminal 106 or a stationary telephone 132. It is to be noted that for different embodiments of the mobile terminal 100 and in different situations, different ones of the telecommunications services referred to above may or may not be available; the teachings of the present application are not limited to any particular set of services in this respect.

The mobile terminals 100, 106 are connected to a mobile telecommunications network 110 through RF links 102, 108 via base stations 104, 109. The mobile telecommunications network 110 may be in compliance with any commercially available mobile telecommunications standard, such as GSM, UMTS, D-AMPS, CDMA2000, FOMA and TD-SCDMA.

The mobile telecommunications network 110 is operatively connected to a wide area network 120, which may be Internet or a part thereof. An Internet server 122 has a data storage 124 and is connected to the wide area network 120, as is an Internet client computer 126. The server 122 may host a www/wap server capable of serving www/wap content to the mobile terminal 100.

A public switched telephone network (PSTN) 130 is connected to the mobile telecommunications network 110 in a familiar manner. Various telephone terminals, including the stationary telephone 132, are connected to the PSTN 130.

The mobile terminal 100 is also capable of communicating locally via a local link 101 to one or more local devices 103. The local link can be any type of link with a limited range, such as Bluetooth, a Universal Serial Bus (USB) link, a Wireless Universal Serial Bus (WUSB) link, an IEEE 802.11 wireless local area network link, an RS-232 serial link, etc. The local devices 103 can for example be various sensors that can communicate measurement values to the mobile terminal 100 over the local link 101.

Figure 2:
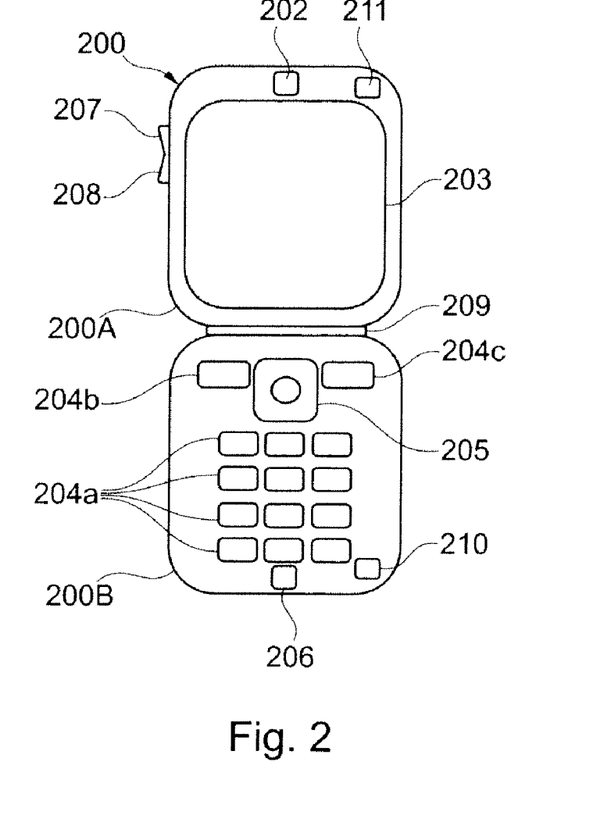
FIG. 2 is a plane front view of a device according to an embodiment.

An embodiment 200 of the mobile terminal 100 is illustrated in more detail in FIG. 2. The mobile terminal 200 comprises a speaker or earphone 202, a microphone 206, a main or first display 203 and a set of keys 204 which may include a keypad 204a of common ITU-T type (alpha-numerical keypad representing characters "0"-"9", "*" and "#") and certain other keys such as soft keys 204b, 204c and a joystick 205 or other type of navigational input device. The device is also equipped with one or two volume keys 207 and 208. If one key 207 is used it is usually a two-way key each direction being associated with either volume up or volume down. If two keys are used one is associated with volume up 207 and the other with volume down 208.

The device has two housing bodies 200A and 200B that are movably connected through a hinge 209. By rotating the housing bodies 200A and 200B around the hinge 209 they can be moved to an open position (as in FIG. 2) or to a closed position (not shown in FIG. 2, see FIG. 4). To keep the two housing bodies 200A and 200B in the closed position a locking mechanism comprising a magnet 210 and an anchor plate 211 is arranged on each of the two body housings 20A and 200B. In this embodiment the anchor plate is arranged on the second housing body 200B and the magnet is arranged on the first housing body 200A. It is not so important where on the two housing bodies the anchor plate 211 and magnet 210 pair are arranged as long as they are arranged to overlap each other in the closed position. However, it is obvious to a skilled person that the further from the hinge 209 the anchor plate 211 and magnet 211 are placed the weaker the magnet has to be to maintain the two housing bodies 200A and 200B in a closed position.

In this embodiment the magnet 210 is an electrical magnet. It should be noted that other magnets can also be used.

In one alternative applicable to all embodiments described herein the magnet 210 comprises a permanent magnet and an electromagnet. The electromagnet is designed to neutralize the permanent magnet when activated. This allows for that a device incorporating such a locking mechanism will remain closed even when it is powered off.

In this embodiment the anchor plate 211 is a metal plate. It should be noted that the anchor plate could also be a magnet.

In this embodiment the hinge 209 is biased to force the two housing bodies 200A and 200B into the open position. Thus a de-activation of the electrical magnet will cause the device to open up as the hinge 209 will then be able to unhindered force the two housing bodies 200A and 200B apart and into the open position.

As the magnet 210 is removed from the anchor plate 211 the magnetic flux between them will be reduced and there through also the magnetic force holding the anchor plate 211 and the magnet 210 together. As the device is subjected to mechanical shock the magnet 210 and the anchor plate 211 may be temporarily removed from or shifted with respect to one another so that the magnetic flux becomes too weak to keep the housing bodies 200A and 200B in the closed position and the device opens up.

Figure 3:
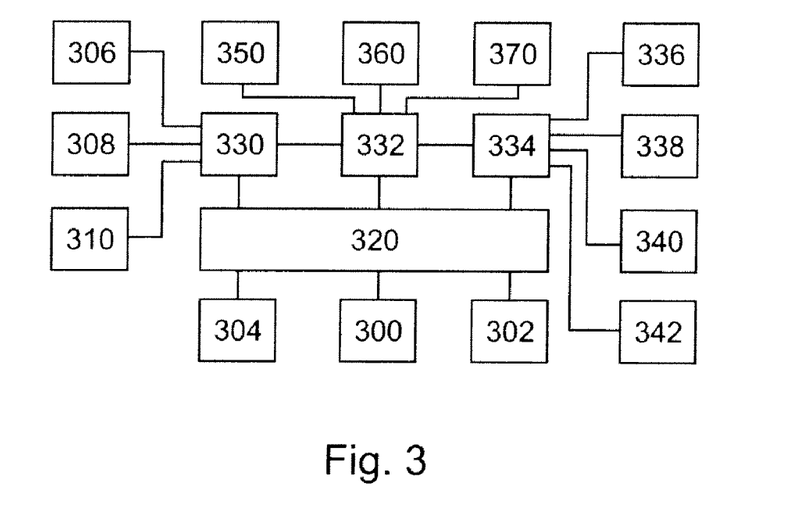
FIG. 3 is a block diagram illustrating the general architecture of a device of FIG. 1 in accordance with the present application.

The internal component, software and protocol structure of the mobile terminal 200 will now be described with reference to FIG. 3. The mobile terminal has a controller 300 which is responsible for the overall operation of the mobile terminal and may be implemented by any commercially available CPU ("Central Processing Unit"), DSP ("Digital Signal Processor") or any other electronic programmable logic device. The controller 300 has associated electronic memory 302 such as RAM memory, ROM memory, EEPROM memory, flash memory, or any combination thereof. The memory 302 is used for various purposes by the controller 300, one of them being for storing data used by and program instructions for various software in the mobile terminal. The software includes a real-time operating system 320, drivers for a man-machine interface (MMI) 334, an application handler 332 as well as various applications. The applications can include a message text editor 350, a calendar application 360, as well as various other applications 370, such as applications for voice calling, video calling, sending and receiving Short Message Service (SMS) messages, Multimedia Message Service (MMS) messages or email, web browsing, an instant messaging application, a phone book application, a notepad application, a control panel application, a camera application, one or more video games, etc. It should be noted that two or more of the applications listed above may be executed as the same application The MMI 334 also includes one or more hardware controllers, which together with the MMI drivers cooperate with the first display 336/203, and the keypad 338/204 as well as various other I/O devices such as microphone, speaker, vibrator, ringtone generator, LED indicator, etc. As is commonly known, the user may operate the mobile terminal through the man-machine interface thus formed.

The software also includes various modules, protocol stacks, drivers, etc., which are commonly designated as 330 and which provide communication services (such as transport, network and connectivity) for an RF interface 306, and optionally a Bluetooth interface 308 and/or an IrDA interface 310 for local connectivity. The RF interface 306 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, band pass filters, amplifiers, mixers, local oscillators, low pass filters, AD/DA converters, etc.

The mobile terminal also has a SIM card 304 and an associated reader. As is commonly known, the SIM card 304 comprises a processor as well as local work and data memory.

Figure 4:
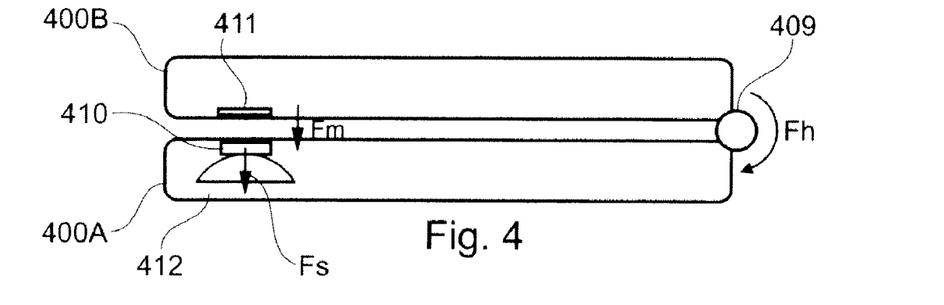
FIG. 4 is a schematic view of a device according to an embodiment, FIGS. 5A and B are views of a locking mechanism according to an embodiment, FIGS. 6A and B are cut out views of a printed wire board according to an embodiment.

FIG. 4 shows a schematic view of a device 400 according to the teachings herein. The device 400 is, in this exemplary embodiment, a mobile phone such as is described with reference to FIG. 2. The device 400 is shown here in a closed position.

An anchor plate 411 is arranged adjacent to an electrical magnet 410 which in turn is suspended by a mechanical spring 412. As the magnet 410 is not rigidly fixed it is able to move to some degree which enables it to move as a shock hits the device which enables the magnet 410 to remain in close contact with the anchor plate 411 which results in that the device's two housing bodies 400A and 400B are maintained in the closed position even as the device is subjected to mechanical shock. Depending on the design of the spring 412 the magnet can move either transitionally or rotationally or both.

To prevent that the spring 412 is subjected to abuse and thereby deformed mechanical stops may be applied to prevent that the spring 412 is stretched or compressed too far.

In one embodiment the spring 412 is a magnetic spring 412. Such a spring may be implemented by assigning the magnet 410 the same polarity as the underlying substrate. In this case the magnet 410 will hover above the underlying substrate. Such a magnet can be kept in place while still allowing freedom of movement by using guiding grooves and cooperating pins. As the magnet would then be freely suspended it would be self-stabilizing with regards to its position relative the anchor plate. The magnet would on its own motion assume the position where the greatest magnetic flux between the magnet and the anchor plate is achieved.

The spring 412 is designed to have a spring coefficient that will not allow the force exerted on the magnet from the spring to supersede the force exerted by the magnet 410 on the anchor plate 411 until the spring is fully compressed at end-of-stroke. If that would happen the phone would open as the magnet would be pulled away from the anchor plate thus causing the locking mechanism to fail to maintain the two housing bodies in the closed position. Thus Fm>Fs, Fm=Force exerted by magnet 410 and Fs=Force exerted by the spring 412 at full or end-of-stroke. If the hinge 409 is biased for example by a spring (not shown) this biasing will add another force Fh acting to separate the two housing bodies and force them into the open position. In such cases the force exerted by the magnet 410 has to be greater than the sum of the spring force, Fs and the hinge force, Fh, in other words: Fm>Fs+Fh.

Figure 5A:
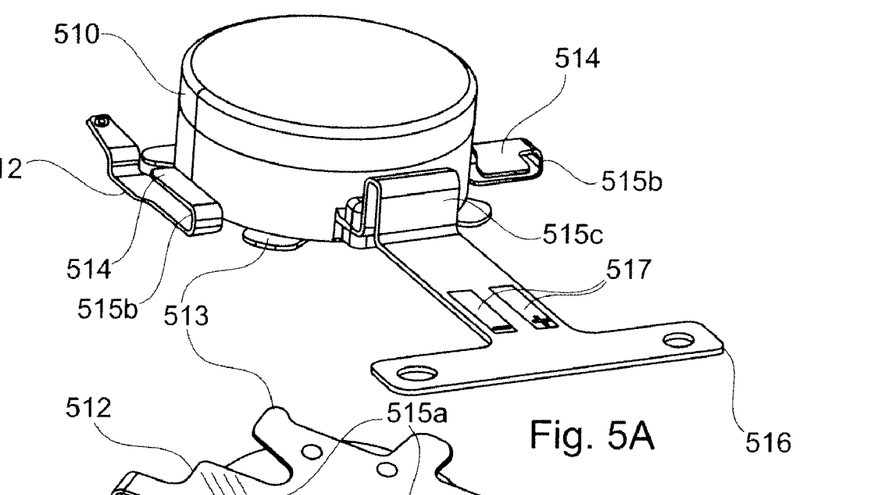
Figure 5B:
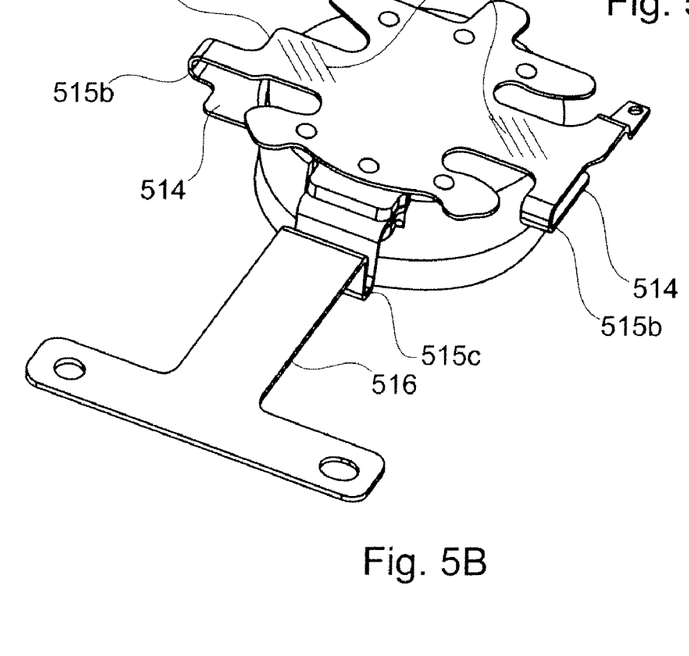

In one embodiment the spring is designed to maintain the magnet at an equilibrium level allowing it to move both towards and away from the anchor plate and also to rotate or shift sideways. Such a spring will be described in greater detail with reference to FIG. 5.

FIGS. 5A and 5B show a locking mechanism comprising a spring and magnet arrangement according to an embodiment. FIG. 5A shows said arrangement from above and FIG. 5B shows said arrangement from below, directions being in relation to the location of a cooperating anchor plate. The locking mechanism is configured to cooperate with an anchor plate which is not shown. The locking mechanism comprises a spring element 512 which is mounted on a magnet 510, in this embodiment it is an electrical magnet 510. The spring element is shaped so that in the middle it is attached to the underside of the magnet 510—or the inactive side of the electrical magnet 510. The spring 512 further has interface surfaces 514 that extend outside the magnet 510. These interface surfaces are arranged to be mounted on a supporting surface such as a printed wire board for example. The interface surfaces 514 are arranged on elongated portions of the spring 512, which elongated portions are bent thereby causing deflection areas 515a. These deflection areas thus provide for the spring effect of the metal body the spring 512 is comprised of. See FIG. 5B.

The spring 512 is further equipped with protrusions 513 that extend beyond the magnet 510. These protrusions are arranged to act as mechanical stops as the magnet 510 is placed in a cavity or a hole preventing the magnet from moving completely through the hole or cavity as the extent of the protrusions 513 are larger than the diameter of the hole.

In this embodiment the spring 512 is attached to the magnet 510 by black welding. It should be noted that also other methods of attachment are possible as is commonly known.

To further increase the freedom of movement of the magnet 510 the elongated portions on which the interface surfaces 514 are bent thereby providing for further deflection areas 515b.

The mechanical stops or protrusions 513 serve two purposes. The first is to protect the spring 512 from bending too far and thus becoming deformed. And the second purpose is to prevent that the surface of the magnet 510 is scratched or otherwise damaged if the magnet were to shoot out too far.

In this embodiment the spring 512 is made of one unitary metal body comprising both the mechanical stops and the interface surfaces. This allows the spring to be manufactured and assembled more easily and thus saves cost.

The magnet 510 is in this embodiment further arranged with a supporting member 516 also having a deflection area 515c. The main purpose of this supporting member is to provide electrical contacts 517 to the electromagnet 510. The supporting member is bent just before the attachment point with the magnet 510 which results in a further deflection area 515c which also adds to the spring effect of the spring 512.

In this embodiment the magnet 510 has a diameter of 7.55 mm and the interface surfaces 514 extend to 4.2 mm from the center of the magnet 510 thus enabling the magnet to be housed in a cavity or a hole with a diameter of less than 8.4 mm. The mechanical stops 513 extend substantially an equal amount as the surface stops, but it should be understood that the mechanical stops 513 only need to extend further than the hole or cavity in which the magnet 510 is to be housed.

The spring 512 is 0.1 mm thick, made of the material SUS301H and has a yield strength of 1030 N/mm2.

The magnet 510 is attached to the spring 512 through dot laser welding with a peel off force of around 10 N to prevent accidental peeling off while still allowing for an easy laser welding.

Figure 6A:
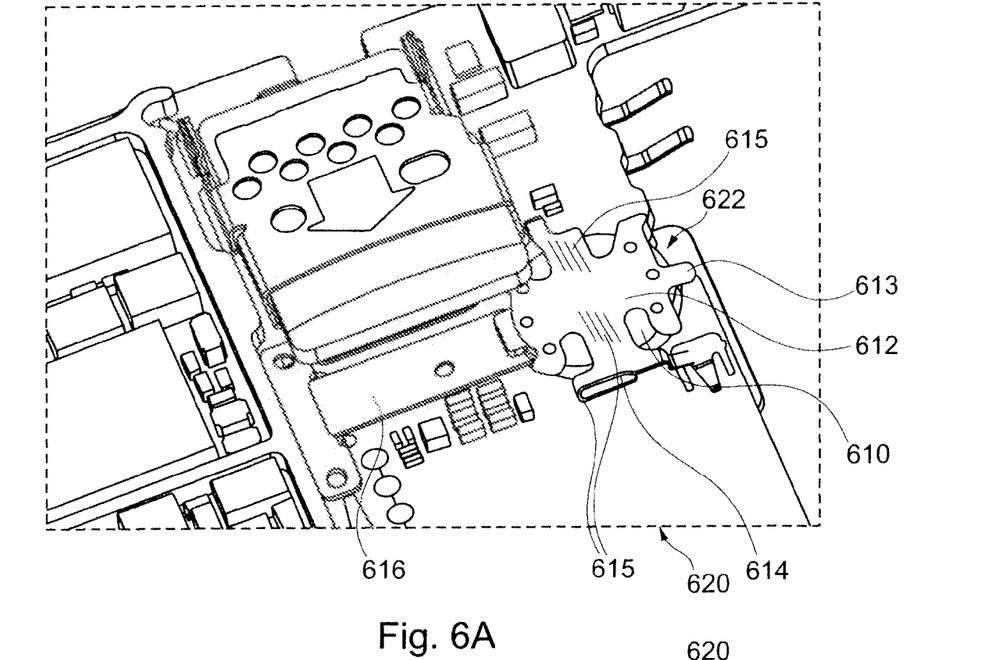
Figure 6B:
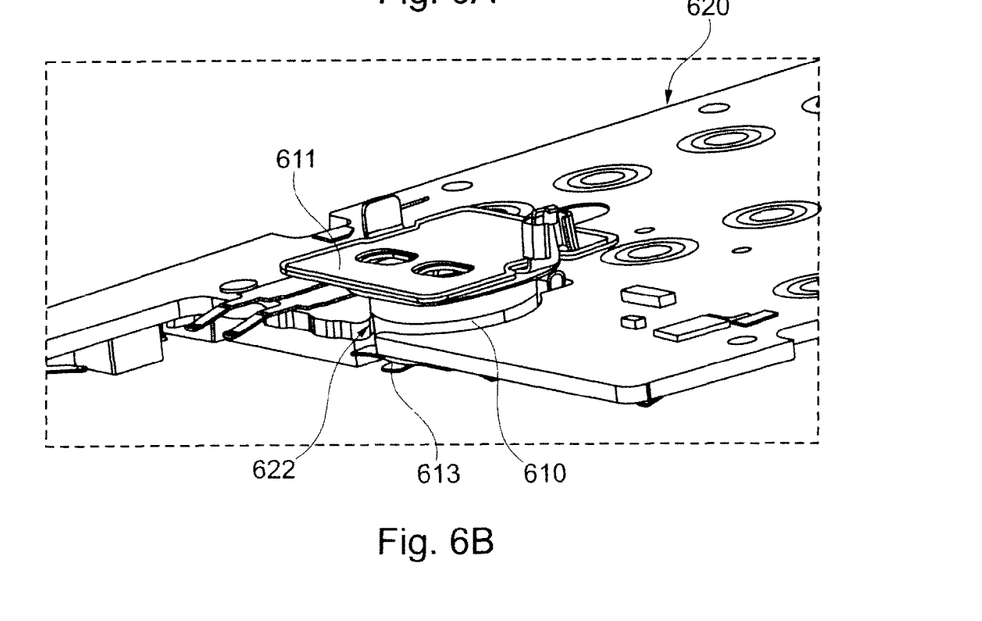

FIGS. 6A and 6B each show a cut out of a printed wire board 620 having a locking mechanism comprising a spring and magnet arrangement according to an embodiment. FIG. 6A shows said arrangement from below and FIG. 6B shows said arrangement from above, directions being in relation to the location of a cooperating anchor plate 611 shown in FIG. 6B. The printed wire board 620 is provided with a cavity 622, in this embodiment a hole with an open end. The hole is designed to be able to receive a locking mechanism, i.e. a magnet 610. The magnet is to be mounted in this hole 622 with the supporting surfaces 614 on a side of the printed wire board 620 opposite to the active end of the magnet 610. The mechanical stops 613 are designed so that they extend beyond the hole 622 so that if the magnet 610 moves through the hole the mechanical stops 614 will abut the edge of the hole 622 and stop the magnet 610. FIG. 6B also shows the anchor plate 611 and its placement in relation to the magnet 610. It should be understood that the anchor plate 611 is not to be mounted on the same printed wire board 620, it is only shown for illustrative purposes.

Figure 7:
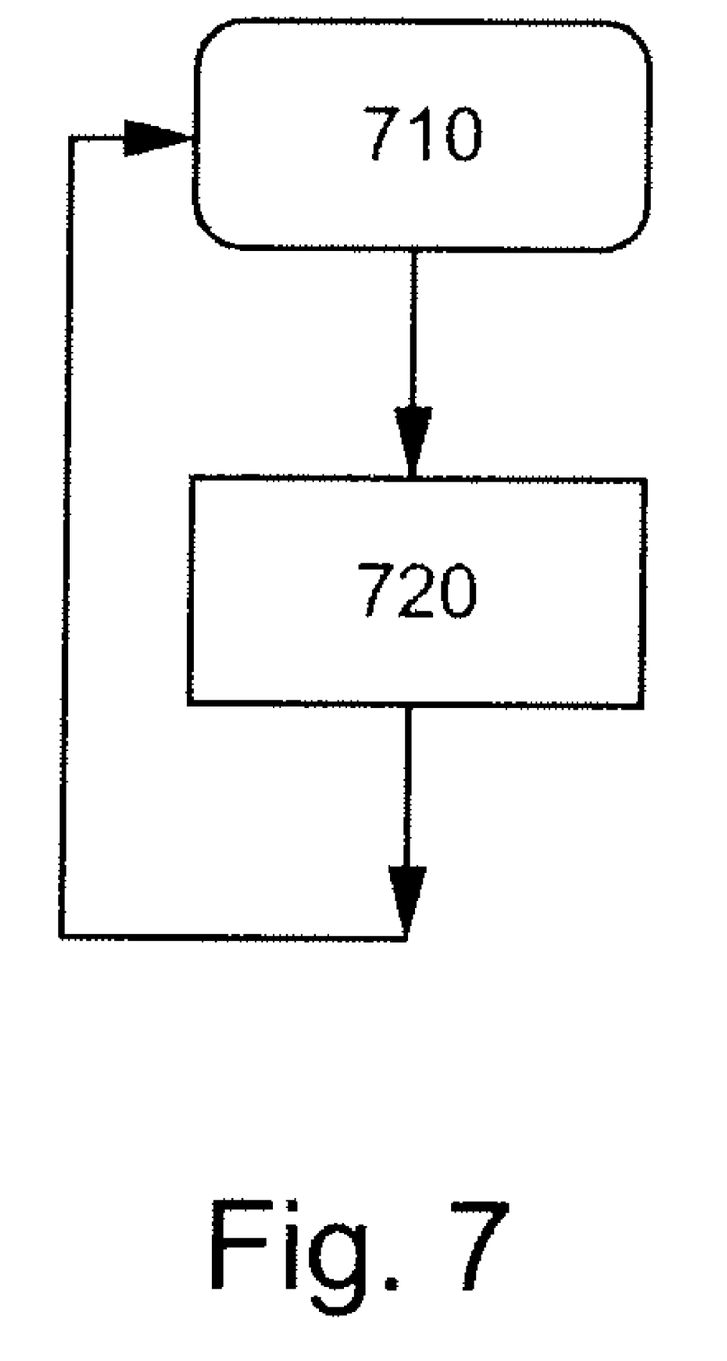
FIG. 7 is a flow chart describing a method according to an embodiment.

FIG. 7 shows a flowchart of a method according to an embodiment. In a first step 710 a device is in a closed position and the magnet is in an idle state exerting a closing force on an anchor plate. For the alternative of using an electromagnet to neutralize a permanent magnet as is described with reference to FIG. 2, the idle state is when the electromagnet is turned off and the permanent magnet is exerting a closing force on the anchor plate. The magnet is arranged in one of two housing bodies of the device and the anchor plate is arranged in a second housing body. As a device is subjected to mechanical shock, as though the device has been dropped, some of this mechanical shock will act on the two housing bodies forcing them to separate from the closed position. This would in a prior art solution cause the anchor plate and the magnet to be removed from each other thus reducing the magnetic field or force keeping the two housing bodies together in the closed position and causing the device to open as the magnetic force becomes too weak. In a second step 720 the magnet is therefore moved according to the mechanical shock so as to follow the anchor plate. This is achieved by the magnet being mounted on a spring that allows the magnet to move to some extent. The magnet can then maintain a substantially constant distance to the anchor plate and thus maintain the magnetic force strong enough to keep the two housing bodies in the closed position.

The various aspects of what is described above can be used alone or in various combinations. The teaching of this application may be implemented by a combination of hardware and software, but can also be implemented in hardware or software. The teaching of this application can also be embodied as computer readable code on a computer readable medium. It should be noted that the teaching of this application is not limited to the use in mobile communication terminals such as mobile phones, but can be equally well applied in Personal digital Assistants (PDAs), game consoles, MP3 players, personal organizers or any other device designed for having foldable or hingably connected parts.

The teaching of the present application has numerous advantages. Different embodiments or implementations may yield one or more of the following advantages. It should be noted that this is not an exhaustive list and there may be other advantages which are not described herein. One advantage of the teaching of this application is that a device incorporating a locking mechanism with a movable magnet will be able to maintain its two housing bodies in a locked position even when subjected to mechanical shock as when being submitted to drop testing.

Another advantage of the teaching of the present application is that the locking mechanism will be more robust as when it is subjected to mechanical shock the spring absorbs some of the forces or energies that would otherwise be absorbed by the magnet or a printed wire board carrying the magnet.

Although the teaching of the present application has been described in detail for purpose of illustration, it is understood that such detail is solely for that purpose, and variations can be made therein by those skilled in the art without departing from the scope of the teaching of this application.

For example, although the teaching of the present application has been described in terms of a mobile phone, it should be appreciated that the teachings of the present application may also be applied to other types of electronic devices, such as a media player, a photographic camera, a video camera, a game console, a calculator, a Personal computer, Palmtop- or Laptop computers, GPS devices or PDA's and the like. It should also be noted that there are many alternative ways of implementing the methods and apparatuses of the teachings of the present application.

The term "comprising" as used in the claims does not exclude other elements or steps. The term "a" or "an" as used in the claims does not exclude a plurality. A unit or other means may fulfill the functions of several units or means recited in the claims.

The invention claimed is:

1. A device having a locking mechanism comprising:
   a first and a second housing body configured to assume an open and a closed position; and
   a magnet and a spring, said magnet being configured to cooperate with an anchor and said spring being configured to suspend said magnet;
   wherein the anchor is arranged in said second housing body and said magnet is movably connected to said first housing body by said spring.

2. A locking mechanism according to claim 1 further comprising a mechanical stop.

3. A locking mechanism according to claim 1 said spring comprises an interface surface for cooperating with a supporting surface.

4. A locking mechanism according to claim 3 wherein said spring and said interface surface consist of one unitary body.

5. A locking mechanism according to claim 4 wherein said spring comprises a deflection area in said unitary body.

6. A locking mechanism according to claim 1 wherein said spring is a magnetic spring.

7. A locking mechanism according to claim 3 wherein said spring is a mechanical spring.

8. A locking mechanism according to claim 1 wherein said magnet comprises an electromagnet and a permanent magnet.

9. A locking mechanism according to claim 8, wherein said electromagnet is configured to neutralize said permanent magnet when activated.

10. A printed wire board comprising a cavity arranged to at least partially receive a locking mechanism according to claim 1.

11. A printed wire board according to claim 10 wherein said locking mechanism comprises a mechanical stop arranged on an opposite side of said printed wire board with regards to a side of said magnet being capable of being active, said mechanical stop extending beyond said cavity.

12. A printed wire board according to claim 10, wherein said locking mechanism comprises an interface surface arranged to attach said spring to said printed wire board.

13. A printed wire board according to claim 10, wherein said cavity is a hole through said printed wire board.

14. A device according to claim 1, wherein said first and second housing bodies are movably connected by a hinge.

15. A device according to claim 1, wherein said device is a mobile communication terminal, a media player, a photographic camera, a video camera, a game console, a calculator, a global positioning system device or a personal digital assistant.

16. A method for maintaining two housing bodies of a device in a closed position comprising exerting a magnetic force from a magnet arranged in one of said housing bodies on an anchor plate arranged in another of said housing bodies,
   receiving mechanical shocks to said device
   and moving said magnet according to said received shocks to maintain said magnetic force strong enough to maintain said two housing bodies in said closed position.

17. A method according to claim 16, further comprising suspending said magnet by a spring.

18. A device incorporating and implementing or configured to incorporate and implement a method according to claim 16.

19. A device comprising two housing bodies configured to assume an open and a closed position, said device further comprising magnetic means for maintaining said housing bodies in said closed position, said magnetic means comprising suspension means for moving said magnetic means in accordance with mechanical shocks received by said device.

20. A device according to claim 19, wherein said suspension means comprises spring means.

* * * * *